(12) United States Patent
Abdallah et al.

(10) Patent No.: US 11,144,811 B2
(45) Date of Patent: Oct. 12, 2021

(54) ASPECT PRE-SELECTION USING MACHINE LEARNING

(71) Applicant: eBay Inc., San Jose, CA (US)

(72) Inventors: Farah Abdallah, Seattle, WA (US); Robert Enyedi, Santa Clara, CA (US); Amit Srivastava, San Jose, CA (US); Elaine Lee, Fremont, CA (US); Braddock Craig Gaskill, Alhambra, CA (US); Tomer Lancewicki, Jersey City, NJ (US); Xinyu Zhang, San Jose, CA (US); Jayanth Vasudevan, Fremont, CA (US); Dominique Jean Bouchon, Cupertino, CA (US)

(73) Assignee: eBay Inc., San Jose, CA (US)

( * ) Notice: Subject to any disclaimer, the term of this patent is extended or adjusted under 35 U.S.C. 154(b) by 748 days.

(21) Appl. No.: 15/859,239

(22) Filed: Dec. 29, 2017

(65) Prior Publication Data
US 2019/0156177 A1    May 23, 2019

Related U.S. Application Data

(60) Provisional application No. 62/588,868, filed on Nov. 20, 2017.

(51) Int. Cl.
*G06F 3/048* (2013.01)
*G06N 3/00* (2006.01)
(Continued)

(52) U.S. Cl.
CPC ........... *G06N 3/006* (2013.01); *G06F 16/248* (2019.01); *G06F 16/50* (2019.01);
(Continued)

(58) Field of Classification Search
CPC ........ G06N 3/006; G06N 20/00; G06F 40/30; G06F 16/50; G06F 16/90332;
(Continued)

(56) References Cited

U.S. PATENT DOCUMENTS

| 9,792,281 | B2 | 10/2017 | Sarikaya | |
|---|---|---|---|---|
| 2006/0184625 | A1* | 8/2006 | Nordvik | G06F 40/295 709/204 |
| 2010/0312724 | A1* | 12/2010 | Pinckney | G06Q 30/02 706/11 |
| 2014/0279050 | A1 | 9/2014 | Makar et al. | |
| 2015/0347519 | A1 | 12/2015 | Hornkvist et al. | |
| 2016/0188608 | A1* | 6/2016 | Brewer | G06F 16/90324 707/767 |

(Continued)

FOREIGN PATENT DOCUMENTS

WO    2019/099913 A1    5/2019

OTHER PUBLICATIONS

International Search Report for PCT Application No. PCT/US2018/061635, dated Feb. 14, 2019, 5 pages.
(Continued)

*Primary Examiner* — Pei Yong Weng
(74) *Attorney, Agent, or Firm* — FIG. 1 Patents

(57) ABSTRACT

Aspect pre-selection techniques using machine learning are described. In one example, an artificial assistant system is configured to implement a chat bot. A user then engages in a first natural-language conversation. As part of this first natural-language conversation, a communication is generated by the chat bot to prompt the user to specify an aspect of a category that is a subject of a first natural-language conversation and user data is received in response. Data that describes this first natural-language conversation is used to train a model using machine learning. Data, is then be received by the chat bot as part of a second natural-language conversation. This data, from the second natural-language conversation, is processed using the model as part of machine learning to generate the second search query to include the aspect of the category automatically and without user intervention.

20 Claims, 8 Drawing Sheets

(51) Int. Cl.
  *G06F 16/50* (2019.01)
  *G06Q 30/06* (2012.01)
  *G06Q 30/02* (2012.01)
  *G06F 16/9032* (2019.01)
  *G06Q 10/10* (2012.01)
  *G06F 40/30* (2020.01)
  *G06N 20/00* (2019.01)
  *G06F 16/248* (2019.01)

(52) U.S. Cl.
  CPC ........ *G06F 16/90332* (2019.01); *G06F 40/30* (2020.01); *G06N 20/00* (2019.01); *G06Q 10/10* (2013.01); *G06Q 30/0256* (2013.01); *G06Q 30/0601* (2013.01); *G06Q 30/0625* (2013.01)

(58) Field of Classification Search
  CPC .............. G06F 16/248; G06Q 30/0625; G06Q 30/0256; G06Q 30/0601; G06Q 10/10
  See application file for complete search history.

(56) References Cited

U.S. PATENT DOCUMENTS

| | | |
|---|---|---|
| 2017/0148073 A1 | 5/2017 | Nomula et al. |
| 2017/0220680 A1* | 8/2017 | Shattuck ................ G06F 16/951 |
| 2017/0230312 A1 | 8/2017 | Barrett et al. |
| 2017/0278135 A1* | 9/2017 | Majumdar ......... G06K 9/00362 |
| 2017/0293834 A1 | 10/2017 | Raison et al. |
| 2017/0310613 A1 | 10/2017 | Lalji et al. |

OTHER PUBLICATIONS

International Written Opinion for PCT Application No. PCT/US2018/061635, dated Feb. 14, 2019, 11 pages.

International Preliminary Report on Patentability received for PCT Application No. PCT/US2018/061635, dated Jun. 4, 2020, 13 pages.

* cited by examiner

ASPECT PRE-SELECTION USING MACHINE LEARNING

RELATED APPLICATIONS

This Application claims priority under 35 U.S.C. Section 119(e) to U.S. Provisional Patent Application No. 62/588,868, filed Nov. 20, 2017, and titled "Application Pre-selection using Machine Learning," the entire disclosure of which is hereby incorporated by reference in its entirety.

BACKGROUND

Search is one of the primary techniques, via which, users of computing devices may locate information of interest. Users, for instance, may enter search queries to find digital content such as digital images, video, music, locate goods or services of interest, and so on. Conventional search techniques, however, are typically repetitive and as a result may involve performance of repeated user interactions.

An example of this is conventional artificial assistant systems implemented by a computing device that employ a natural-language conversation to input and refine a search. Forced repetition as part of these conventional systems may thus hinder operation of the computing device and result in user frustration.

SUMMARY

Aspect pre-selection techniques using machine learning are described. In one example, an artificial assistant system is configured to implement a chat bot. A user may then engage in a first natural-language conversation. As part of this first conversation, a communication is generated by the chat bot to prompt the user to specify an aspect of a category that is a subject of a first natural-language conversation. In response, user data is received by the chat bot from the user that specifies the aspect, e.g., responds to the prompt. From this, a first search query is generated that includes the specified aspect. Data that describes this first natural-language conversation is also used to train a model using machine learning based on the specified aspect such that the specified aspect is automatically included without user intervention is subsequent search queries that correspond to that aspect.

Data, for instance, may then be received by the chat bot as part of a second natural-language conversation. This data, from the second natural-language conversation, is then processed using the model as part of machine learning to generate the second search query which is then used to perform another search to include the specified aspect automatically and without further user intervention. A result of a search performed using the second search query is then output, which may be performed along with an indication that the specified aspect is included as part of the second search query. In this way, the user is made aware that the aspect was included automatically as part of the search.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional search techniques as implemented by computing devices are typically static and inflexible. For example, a user may interact with a computing device to navigate to a website to make purchases that are repeated over time. Conventional search techniques, however, force a user to repeat entry of a category (e.g., product type such as "T-shirt") and aspects of the product, e.g., size "S," and color "red." Further, repeated entry as required by conventional techniques hinder operational efficiency of a computing device that incorporates conventional search techniques, especially techniques that involve natural-language conversations like artificial assistant systems.

Conventional techniques are faced with challenges of how to remember which aspects are actually desired by a user, how these aspects apply across different categories, and how these aspects may change over time. Accordingly, techniques are described that employ machine learning to learn aspects of categories to reduce and even limit reentry of these aspects by a user, thus improving an overall user experience and operational efficiency of a computing device that utilizes these techniques. In an example, machine learning is employed to train and use a model over time to describe user interaction involving particular categories (e.g., types of products) and aspects of those categories. The model may then be used to supplement subsequent searches without requiring a user to manually reenter these aspects by determining which aspects correspond to which categories and use those aspects to supplement a search. This is especially beneficial for artificial assistant systems (e.g., personal digital assistants, chatbots) that employ natural-language conversations by reducing a number of prompts output by the artificial assistant systems to obtain data describing these aspects, e.g., in order to perform a search.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
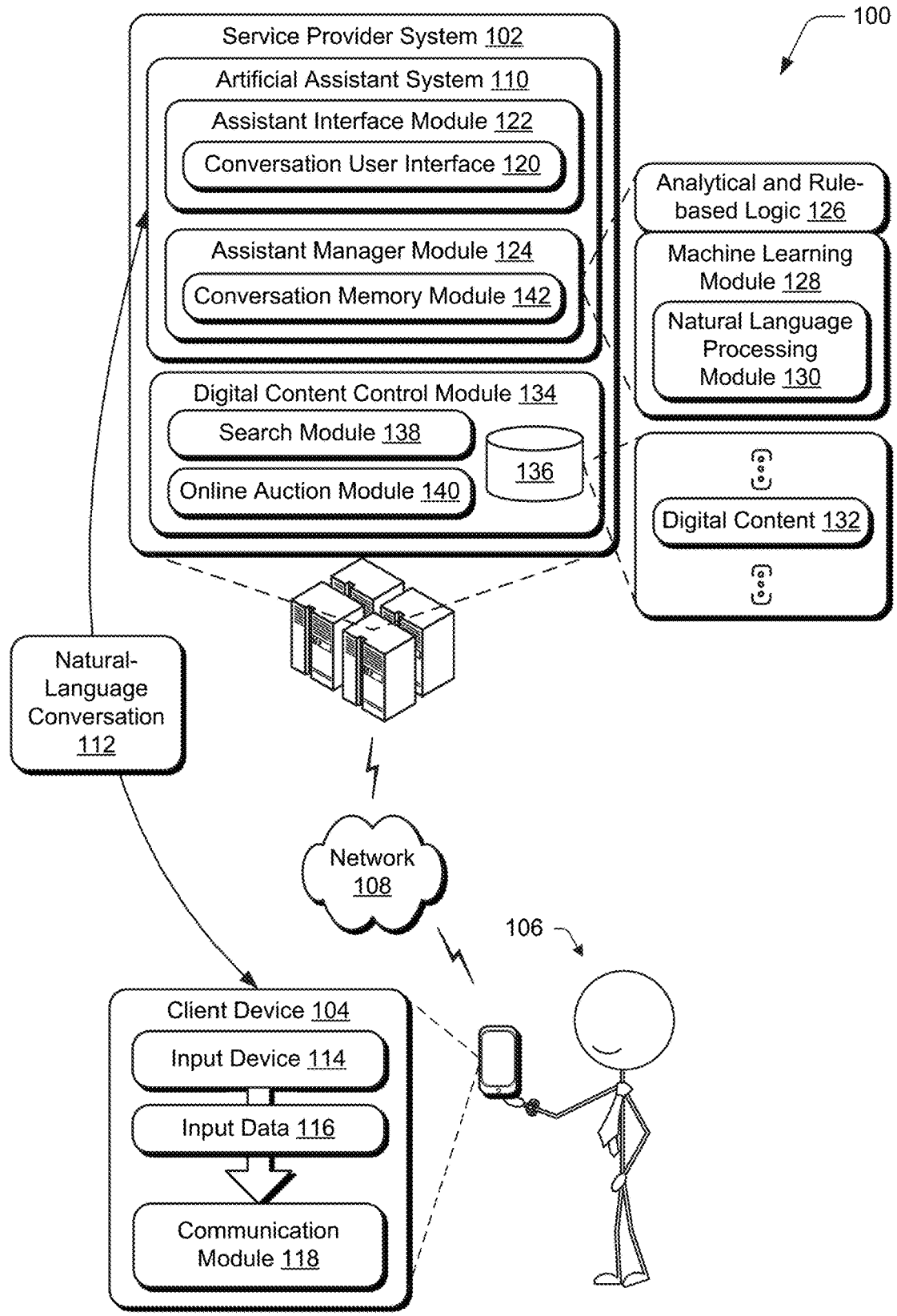
FIG. 1 is an illustration of an environment in an example implementation that is operable to employ aspect pre-selection techniques described herein.

FIG. 1 is an illustration of a digital medium environment 100 in an example implementation that is operable to employ aspect pre-selection techniques described herein. The illustrated environment 100 includes a service provider system 102 and a client device 104 of a user 106 that are communicatively coupled, one to another, via a network 108. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated for the service provider system 102 and as described in relation to FIG. 8.

The service provider system 102 in this example includes an artificial assistant system 110 that is configured to engage in a natural-language conversation 112 with a user 106 of the client device 104. The client device 104, for instance, may include an input device 114 that is usable to generate input data 116, e.g., text via a keyboard, a spoken utterance that is converted to text, capture of a digital image, and so forth. The input data 116 is then communicated by a communication module 118 (e.g., browser, network-enabled application) via the network 108 to a conversation user interface 120 of the artificial assistant system 110.

The conversation user interface 120, for instance, may be configured by an assistant interface module 122 and assistant manager module 124 to implement a chatbot, also known as an interactive agent or artificial conversational entity. The chatbot is configured to virtually simulate a conversational partner to a user 106 of the client device 104 as part of a dialog system to implement the natural-language conversation 112. The assistant manager module 124, for instance, may participate as part of the natural-language conversation 112 by generating communications as part of a "back-and-forth" with the user 106 of the client device 104. This may be employed in a variety of different scenarios, such as customer service, information acquisition, digital commerce, and so forth.

To generate the communications, the assistant manager module 124 may employ a variety of functionality. In one example, analytics and rule-based logic 126 are employed, such as to parse the natural-language conversation 112 for keywords and to locate pre-configured replies based on the keywords. In another example, a machine-learning module 128 is employed that includes a natural-language processing module 130. The machine-learning module 128, for instance, may employ a model that is a computer representation that can be tuned (e.g., trained) based on inputs to approximate unknown functions.

In particular, the model and machine-learning module 128 may employ computer functionality to learn from, and make predictions on, known data by analyzing the known data to learn to generate outputs that reflect patterns and attributes of the known data. Examples of machine learning include decision trees, support vector machines, linear regression, logistic regression, Bayesian networks, random forest learning, dimensionality reduction algorithms, boosting algorithms, artificial neural networks, deep learning, and so forth. Thus, machine learning and a machine learning model are used to make high-level abstractions in data by generating data-driven predictions or decisions from the known input data.

Natural-language processing as implemented by the natural-language processing module 130 is configured to incorporate speech recognition, natural-language understanding, and natural-language generation. This is used to understand communications received from the client device 104 as part of the natural-language conversation 112 as well as to generate communications to the client device 104. The natural-language processing module 130, for instance, may employ a neural network to generate a representation of a communication from the client device 104, and from this, understand "what is being said" as well as to generate an appropriate response, if any. This may be used for a variety of purposes.

In the illustrated example, the artificial assistant system 110 is configured to help control output of digital content 132 by the digital content control module 134 to the client device 104, which is illustrated as stored in a storage device 136. The digital content 132, for instance, may be configured as recommendations, digital marketing content configured to cause conversion of a product or service, streaming digital media, digital music, search results, and so forth. Examples of this are utilized in search by a search module 138, such as to locate a particular item of interest (e.g., a particular product or service), generate a search result, and so forth. For example, an online auction module 140 may be configured to receive bids for particular goods or services. Therefore, to locate an item of interest the search module 138 receives a search query from the artificial assistant system 110 and provided digital content 132 as a result of the search, e.g., identifying a particular item of interest.

Figure 2:
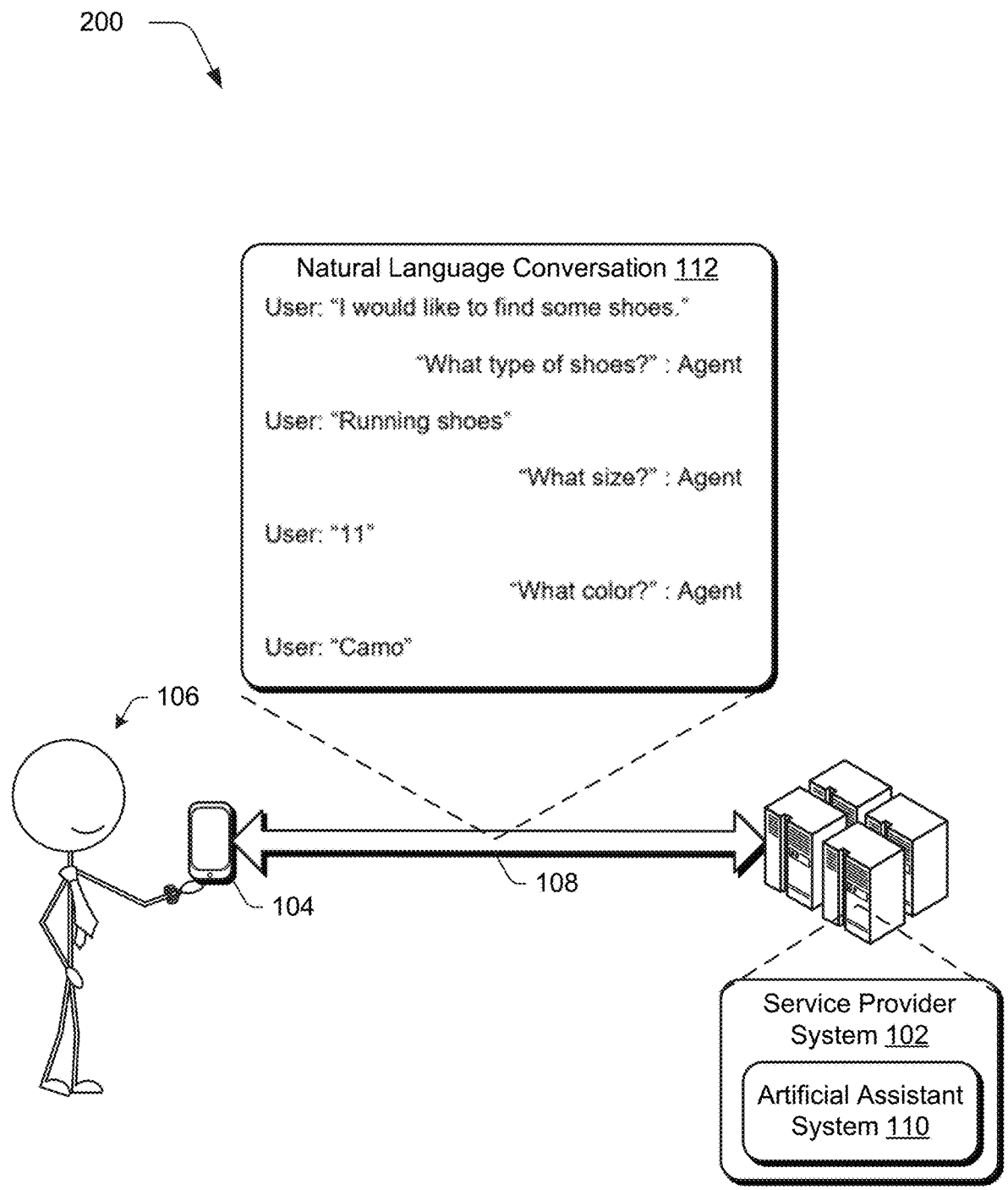
FIG. 2 depicts an example of a natural-language conversation.

As previously described, conventional search techniques may involve significant amounts of repetition. As illustrated in the example implementation 200 of FIG. 2, for instance, a user search for running shoes may involve significant amounts of back and forth communication. This may include generation of prompts by the artificial assistant system 110 to collect data describing aspects of a category that is a basis of the search, such as to obtain aspects as size, color, and so forth, which is then used to form a search query. In practice, the user 106 may initiate the same search numerous times. Conventional techniques, especially as part of a natural-language conversation, however, typically require repeated entry of these aspects, which is both frustrating and computationally inefficient.

Accordingly, the artificial assistant system 110 in this example includes a conversation memory module 142. The conversation memory module 142 is configured to supply a long term memory of aspects of categories as searched by a particular user 106 using machine learning, e.g., as implemented by the machine learning module 128. The conversation memory module 142 may thus address the challenges in how to remember which aspects are actually desired by a user, how these aspects apply across different categories, and how these aspects may change over time.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 3:
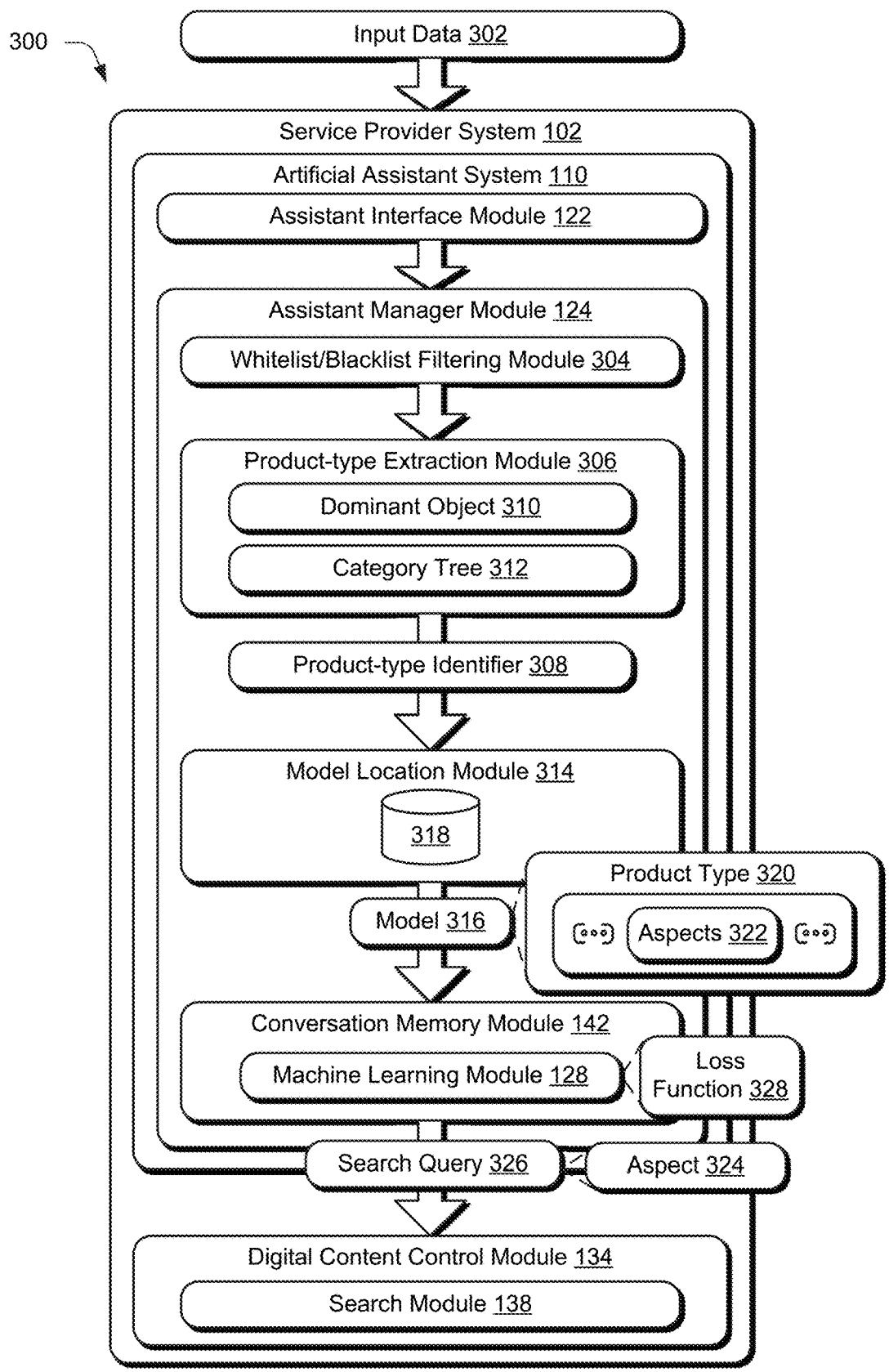
FIG. 3 depicts a system in an example implementation showing operation of an artificial assistant system of FIG. 1 in greater detail.
Figure 4:
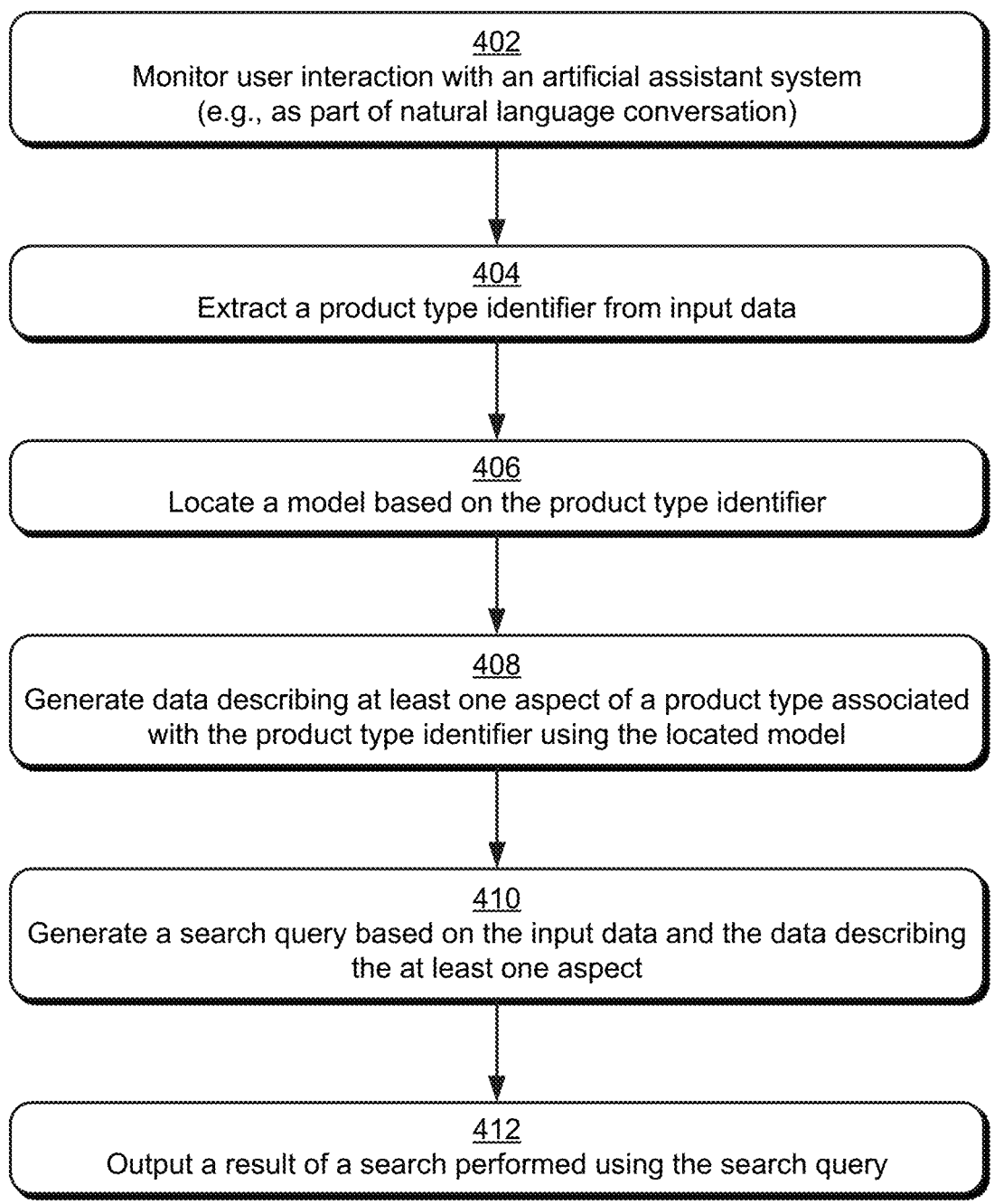
FIG. 4 is a flow diagram depicting a procedure in an example implementation in which machine learning is employed to pre-select aspects of a category as part of a search.

FIG. 3 depicts a system 300 in an example implementation showing operation of the artificial assistant system 110 of FIG. 1 in greater detail. FIG. 4 depicts a procedure 400 in an example implementation in which machine learning is employed to pre-select aspects of a category as part of a search. The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-6.

To begin in this example, user interaction with an artificial assistant system 110 is monitored (block 402), e.g., as part of a natural-language conversation 112. A user 106 of a client device 104, for instance, may originate text inputs, spoken utterances, and/or digital images (e.g., captured using a camera or obtained from storage) as part of a natural-language conversation 112 with the artificial assistant system 110. The natural-language conversation 112 may include exchange of a plurality of communications back and forth between the client device 104 and the artificial assistant system 110. Accordingly, an assistant interface module 122 may receive input data 302 as part of this natural-language conversation 122.

The input data 302 is then filtered by a whitelist/blacklist filtering module 304 to determine if subject matter of the input data 302 is permitted or restricted from use by the artificial assistant system 110. This may be used, for instance, to exclude certain product types from an online market or other search types that are to be restricted.

The filtered input data is then passed to a product-type extraction module 306 to extract a product type identifier 308 (block 404). This may be performed in a variety of ways. In one example, a dominant object 310 is identified from the input data 302. Input data 320, for instance, may include text stating "I want to buy shoes." From this, the product-type extraction module 306 may extract the dominant object 310 "shoes" as a category (e.g., product type) that is to be used as a basis for the search. In another example, a category tree 312 is walked based on keywords in the input data 302 to determine the product type, e.g., from "shoes" to "running shoes" to further refine the product type. A variety of other examples are also contemplated, including natural-language processing. In this way, a subject of a "mission" of the input data 302 (i.e., a goal) of a search is determined by the product type extraction module 306.

The product-type identifier 308 is then used by a model location module 314 to locate a model 316 from a storage device 318 (block 406) from a plurality of models. In this example, each model 316 corresponds to a particular category (e.g., product type) for a user 106. This may be determined through natural-language processing based on semantic similarity, e.g., through comparison in a vector space of representations of the text, such that an exact "match" is not required. The model 316 is then used by the conversation memory module 142 to generate data that describes at least one aspect 324 of a product type associated with the product type identifier 308 (block 408). This is then used to generate a search query 326 based on the input data 302 and the data describing the at least one aspect 324 (block 410). A result of a search performed using the search query is output (block 412), e.g., by a search module 138 of a digital content control module 134. In this way, the model 316 supports a level of granularity per product type 320 for the user, and not just the user overall and thus provides improved accuracy.

The model 316 may be trained in a variety of ways. A machine learning module 128, for instance, may receive input data 302 and generate a search result as described above. User interaction with the search result may then be used to determine accuracy of the search result, e.g., did the search result involve user selection of an item in the search result or cause the user to initiate a new search. This may then be used as part of a loss function 328 to backpropagate through the model 316 (e.g., layers of a neural network) to adjust weights and functions of nodes to "learn" from these results. Thus, the input data 302 also functions as training data in this example such that a previous natural-language conversation by the user 108 with the digital assistant may influence a subsequent natural-language conversation. Accordingly, the model 316 for a product type may be trained during implementation to increase accuracy over time. In an implementation, the model 316 may be pre-trained (e.g., using training data collected from a plurality of users) and then adjusted for a particular user. A search result based on such a search may be configured in a variety of ways to address the aspect 324 that is automatically generated as part of the search query 326. Although this example describes generation of the search result using a product type, other examples are also contemplated, such as through use of a user identifier to locate a model trained for a particular user (e.g., from a plurality of used associated with a single user account) or generally for first and second natural-language conversations.

In one such example, the artificial assistant system 110 is configured to implement a chat bot. A user may then engage in a first natural-language conversation. As part of this, a communication is generated by the chat bot to prompt the user to specify an aspect of a category that is a subject of a first natural-language conversation. In response, user data is received by the chat bot from the user that specifies the aspect, e.g., responds to the prompt. From this, a first search query is generated that includes the specified aspect. Data that describes this first natural-language conversation is also used to train a model using machine learning based on the specified aspect such that the specified aspect is automatically included without user intervention in subsequent search queries that correspond to that aspect.

Data, for instance, may then be received by the chat bot as part of a second natural-language conversation. This data, from the second natural-language conversation, is then processed using the model as part of machine learning to generate the second search query to include the aspect automatically and without user intervention, which is then used to perform another search. A result of a search performed using the second search query is then output, which may be performed along with an indication that the specified aspect is included as part of the second search query. In this way, the user is made aware that the aspect was included automatically as part of the search. The indication may be user selectable to cause performance of a subsequent search without including the aspect.

Figure 5:
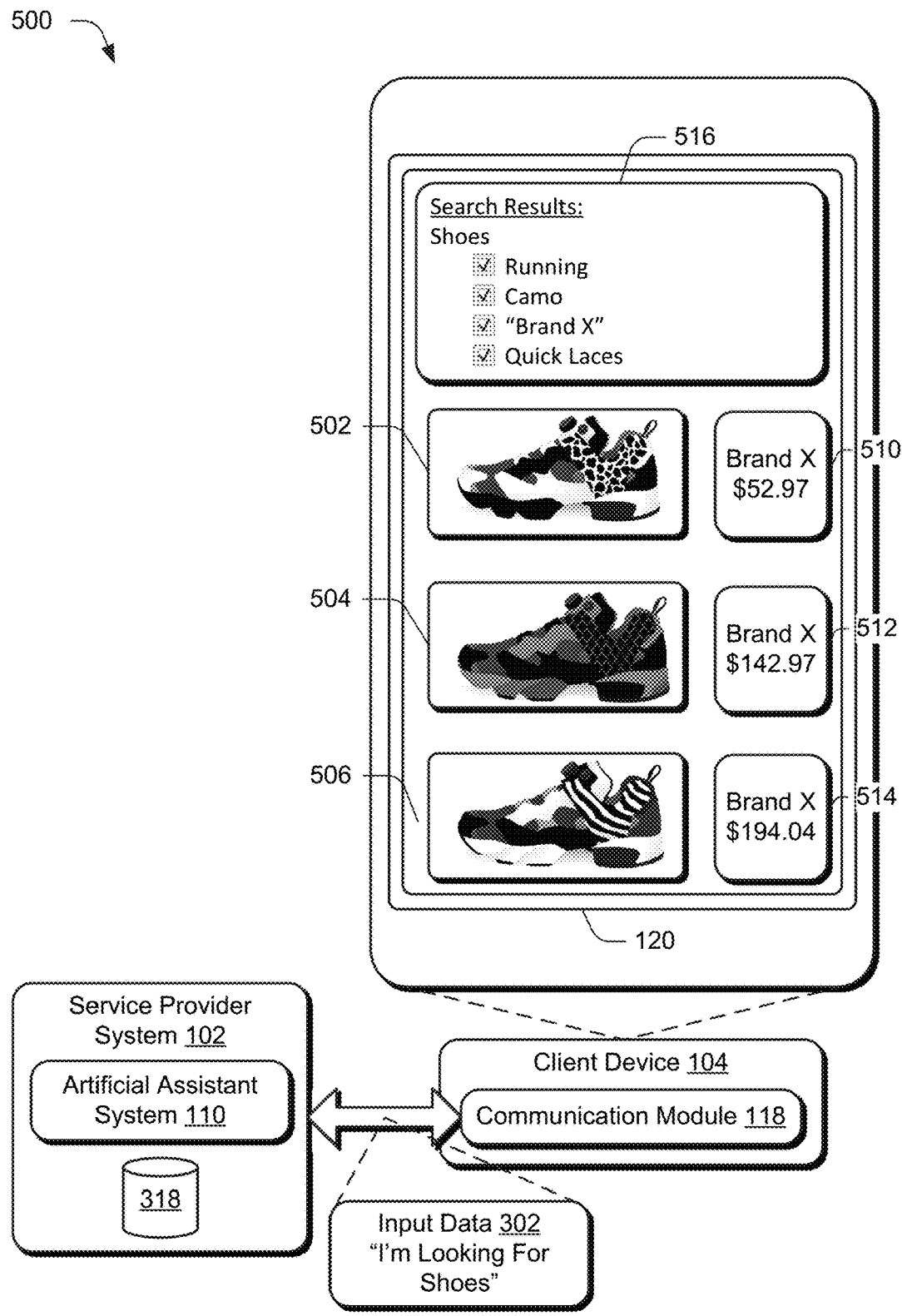
FIG. 5 depicts an example output of a search result including indications that are pre-selected automatically and without user intervention using machine learning.

FIG. 5 depicts an example implementation 500 of a search result based on the search query 326 using the input data 302 and the aspect 324 generated using machine learning. In this example, input data 302 includes text indicating "I'm looking for shoes." Search results are then output in the conversation user interface 120 that include images 520, 504, 506 and identify brands and prices 510, 512, 514. The search result also includes indications 516 of aspects that were added automatically to the search query through machine learning and not by the user. These indications 516 thus provide insight to the user 108 as to what was added to the search.

The indications 516 are also user selectable to initiate another search that does not include respective aspects. In the illustrated example, the user may wish to search for different patterns of running shoes and thus deselect "camo" to initiate another search that includes the aspects of running, "Brand X," and quick laces but does not include the "camo" aspect. These techniques are applicable to a wide variety of scenarios, another example of which includes a real time camera platform as further described in the following and shown in corresponding figures.

Figure 6:
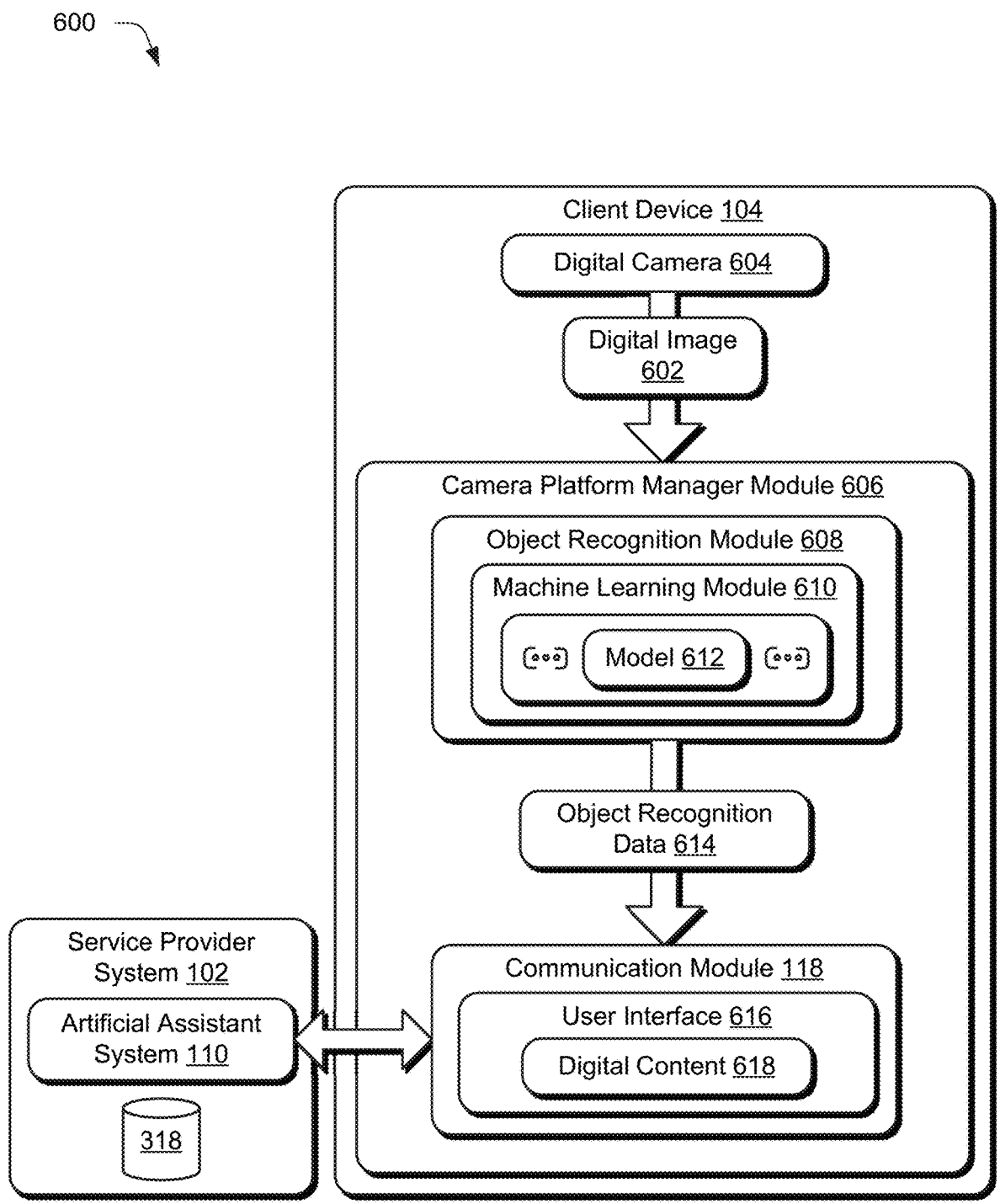
FIG. 6 depicts an example of a real time camera platform usable to incorporate the aspect pre-selection techniques described herein.
Figure 7:
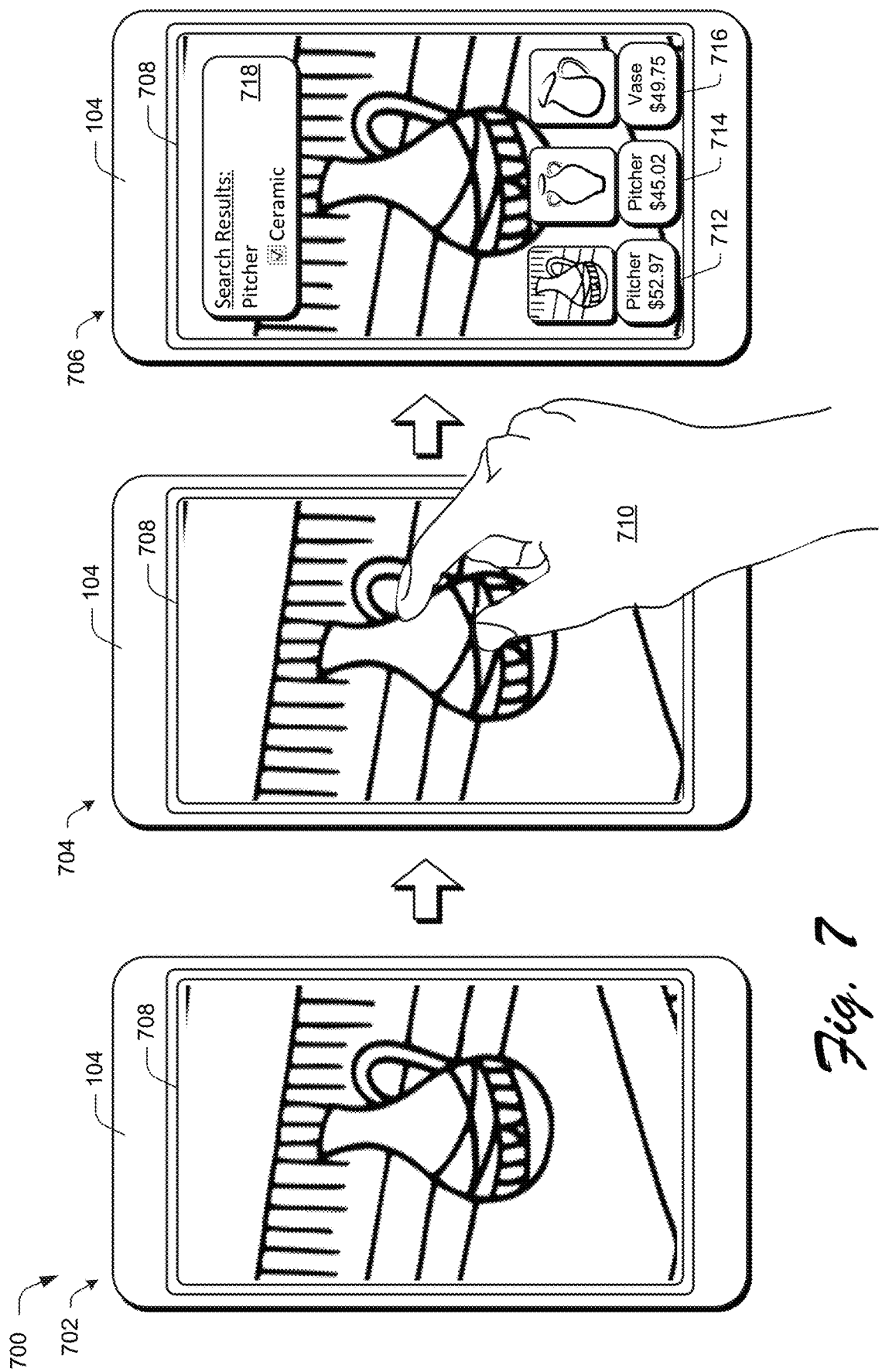
FIG. 7 depicts an example of a user interface of a real time camera platform as incorporate the aspect preselection techniques described herein

FIG. 6 depicts an example system 600 a real time camera platform as incorporating aspect pre-selection techniques. To begin, a digital image 602 is obtained by digital camera 604 of a camera platform manager module 606. The digital image 602, for instance, may be captured using a digital camera, as a screenshot captured from a frame buffer of a computing device, and so forth.

The digital image 602 is then processing by an object recognition module 608 to recognize an object within the digital image 602. The object recognition module 608, for instance, may employ a machine learning module 610 configured to employ models 612 usable to recognize the object using machine learning, e.g., neural networks, convolutional neural networks, deep learning networks, structured vector machines, decision trees, and so forth. The models 612, for instance, may be trained using training digital images that are tagged with corresponding identifications. In an implementation, these training digital images and tags are obtained from a commerce service provider system that are tagged by sellers using the system. As a result, a multitude of accurately tagged training digital images may be obtained with minimal computation and user cost as opposed to conventional manual tagging techniques. Although illustrated as implemented locally by the computing device 102, this functionality may also be implemented in whole or in part by a service provider system 102 via the network 108.

The object recognition data 614 is then communicated to a service provider system 102. The service provider system 102 then uses the data as input data 302 to extract the product-type identifier 308. This is used as previously described to select a model 316 to generate data describing additional aspects 324 that are used as part of a search query 326 as described in relation to FIG. 3. A result of the search performed based on the search query 326 may then be output in real time in a user interface.

Figure 8:
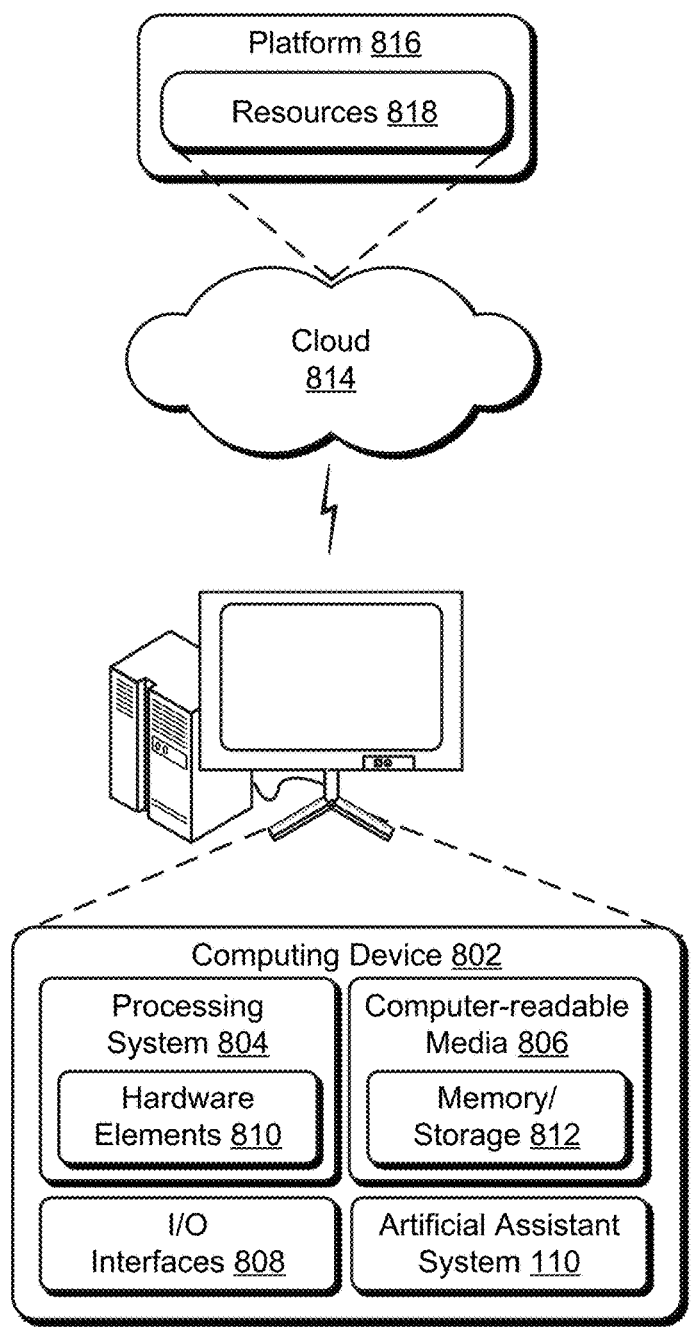
FIG. 8 illustrates an example system including various components of an example device that can be implemented as any type of computing device as described and/or utilize with reference to FIGS. 1-7 to implement embodiments of the techniques described herein.

FIG. 8 depicts an example implementation 800 of user interaction with the camera platform manager module 606. This implementation 800 is illustrated using first, second, and third stages 802, 804, 806.

At the first stage 802, a user interface 708 is output by the output device 218, e.g., a touchscreen display device. The user interface 708 is configured as a "live feed" of digital images 602 obtained in real time from the digital camera 604 in this example.

At the second stage 704, a user input is received that selects an object displayed in the user interface 708. In the illustrated example, the user input is detected as a tap of a finger of the user's hand 708 that is detected using touchscreen functionality of an output device. In this way, a user may distinguish between multiple objects displayed concurrently in the user interface 708. Other examples are also contemplated, such as a spoken utterance or other gestures.

In response to the user selection of the second stage 704, the digital image displayed in the user interface 708 is captured (e.g., obtained from a frame buffer) along with the indication of the location of the particular object, e.g., as guided by X/Y coordinates of the "tap." The digital image 602 is then processed by the object recognition module 608 as described above to identify the object (e.g., the pitcher in the illustrated example) as object recognition data 614.

The object recognition data 614 is then communicated to a service provider system 102 in this example that is configured to support purchase and sale of goods. Accordingly, the service manager module 122 in this example searches a storage device 136 for digital content 132 that pertains to the identified object using the object recognition data 614 as input data 302. The assistant manager module 124 then supplements this data as previously described using machine learning to generate data describing aspects 322 of a category, e.g., the identified product type. The digital content 132 is then configured by as AR digital content for output in the live/real time feed of digital images as the search results.

As shown at the third stage 706, examples of the search results 712, 714, 716 as AR digital content include a name and price (e.g., average price, price for sale, price to buy, etc.) of object available via an electronic commerce system. The AR digital content, as rendered, is configured to remain "as is" relative to the view of the object, e.g., based on data received from orientation sensors such as accelerometers, inertial devices, gravitometers, image processing and feature recognition from the digital images, and so forth.

The AR digital content also includes information regarding the same or similar goods that are available for purchase from the service provider system 102, e.g., as part of an online auction, for a set price, etc. In this way, the camera platform manager module 606 implements the camera platform as non-modal within the user interface 708 such that a user remains within a context of a real time "live" feed of digital images and yet still is able to obtain metadata describing objects included in those digital images. The user 106, for instance, may "look around" at different objects within a living room and readily determine how to buy or sell these objects based on real time information obtained from the service provider system 102.

Further, the search query in this example is supplemented with aspects as previously described. In the illustrated example, for instance, a user may have performed a search for ceramic lamps as part of previous interaction with the camera platform. Accordingly, a subsequent search performed using the camera platform based on a digital image is supplemented with an aspect "ceramic" automatically and without user intervention. As before, an indication 718 may be output to indicate that this aspect was included and is user selectable to remove this aspect from subsequent searches, if desired. A variety of other examples are also contemplated.

Example System and Device FIG. 8 illustrates an example system generally at 800 that includes an example computing device 802 that is representative of one or more computing systems and/or devices that may implement the various techniques described herein. This is illustrated through inclusion of the artificial assistant system 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    generating, of the computing device, a communication to prompt a user to specify an aspect of a category that is a subject of a first natural-language conversation;
    receiving, by the computing device via a user interface, user data describing the specified aspect in response to the communication;
    generating, by the computing device, a first search query including the specified aspect as text generated from the user data;
    training, by the computing device, a model using machine learning based on the specified aspect using the text generated from the user data;
    receiving, by the computing device, data describing a second natural- language conversation;
    identifying, by the computing device, the specified aspect by processing the data describing the second natural-language conversation using the model as part of machine learning;
    automatically adding, by the computing device, the text of the specified aspect to a second search query responsive to the identifying without user intervention and without indicating, in the user interface, the adding of the text to the second search query; and
    outputting, by the computing device, a result of a search performed using the second search query and an indication in the user interface that the text of the specified aspect is added to the second search query.

2. The method as described in claim 1, further comprising identifying, by the computing device, a product type and further comprising locating the model based on the product type.

3. The method as described in claim 2, wherein the identifying includes extracting a dominant object as the product type.

4. The method as described in claim 3, wherein the extracting is performed by walking a category tree based on the received data as part of the second natural-language conversation.

5. The method as described in claim 3, wherein the extracting is based at least in part on a digital image included as part of the first natural- language conversation.

6. The method as described in claim 1, further comprising identifying, by the computing device, a user associated with the second natural- language conversation and further comprising locating the model based on the identified user.

7. The method as described in claim 6, wherein the identifying is performed to identify the user from a plurality of users associated with a single user account.

8. The method as described in claim 1, wherein the outputting of the result of the search includes displaying an indication that the specified aspect is used as part of the search.

9. The method as described in claim 8, wherein the indication is user selectable to initiate a subsequent search query that does not include the specified aspect.

10. The method as described in claim 1, wherein the outputting is configured to cause output of the result of the search as part of a live camera feed used to generate the user data.

11. The method as described in claim 1, wherein the second natural-language conversation does not include the prompt.

12. A method implemented by a computing device, the method comprising:
    extracting, by the computing device, a user identifier from input data, the input data generated as part of a natural-language conversation between a user and an artificial assistant system;
    locating, by the computing device, a model based on the user identifier, the model trained as part of machine learning;

generating, by the computing device, data describing an aspect of a category, the generating performed by processing the input data using the located model as part of machine learning;

generating, by the computing device, a search query based on the input data, the generating including automatically adding the data describing the aspect to the search query without user intervention;

automatically initiating, by the computing device responsive to the generating of the search query, a search using the search query that includes the data; and outputting, by the computing device, a result of the search performed using the search query and the data describing the aspect, the result including an indication that the data is added to the search query and an option displayed proximal to the data that is user selectable to remove the data from the search query.

13. The method as described in claim 12, wherein the model is trained based on a previous natural-language conversation between the user and the artificial assistant system.

14. The method as described in claim 13, wherein the previous natural-language conversation includes generating a communication by the artificial assistant system to prompt the user to specify the aspect of the category.

15. The method as described in claim 12, wherein the result is configured for display in a user interface and includes an indication that the aspect is used to generate the search result.

16. The method as described in claim 12, further comprising extracting a product identifier as part of the natural-language conversation and the locating is also based at least in part on the extracted product identifier.

17. The method as described in claim 16, wherein the input data includes a digital image and the extracting is based on the digital image.

18. A computing device comprising:
a processing system; and
a computer-readable storage medium having instructions stored thereon that, responsive to execution by the processing system, causes the processing system to perform operations including:
receiving data describing a natural-language conversation performed via a user interface;
identifying an aspect by processing the data describing the natural-language conversation using a model trained as part of machine learning;
automatically adding, without user intervention, text of the aspect to a search query responsive to the identifying and without indicating, in the user interface, the adding of the text to the search query; and
outputting a result of a search performed using the search query and an indication that the text of the specified aspect is added to the search query.

19. The computing device as described in claim 18, further comprising automatically initiating, without user intervention, the search using the search query.

20. The computing device as described in claim 18, wherein the outputting is configured to cause output of the result of the search as part of a live camera feed used to generate the user data.

* * * * *